(12) United States Patent
Ramakrishnan et al.

(10) Patent No.: US 7,889,627 B2
(45) Date of Patent: Feb. 15, 2011

(54) PRELOAD MODULATION TO REDUCE HEAD MOTION HYSTERESIS

(75) Inventors: Narayanan Ramakrishnan, Pittsburgh, PA (US); Patrick Beckrow Chu, Wexford, PA (US); Mark David Bedillion, Allison Park, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 568 days.

(21) Appl. No.: 11/935,003

(22) Filed: Nov. 5, 2007

(65) Prior Publication Data
US 2009/0116366 A1   May 7, 2009

(51) Int. Cl.
*G11B 9/00* (2006.01)

(52) U.S. Cl. ........................................ 369/126; 977/947

(58) Field of Classification Search ........................ None
See application file for complete search history.

(56) References Cited

U.S. PATENT DOCUMENTS

| | | | | |
|---|---|---|---|---|
| 2,380,467 A * | 7/1945 | Ressler | ........................ | 346/139 C |
| 5,124,867 A * | 6/1992 | Kitahori et al. | ........................ | 360/256.1 |
| 5,317,152 A | 5/1994 | Takamatsu et al. | | |
| 5,394,388 A | 2/1995 | Hatanaka et al. | | |
| 5,471,458 A | 11/1995 | Oguchi et al. | | |
| 5,490,132 A * | 2/1996 | Yagi et al. | ........................ | 369/126 |
| 5,732,053 A | 3/1998 | Yano et al. | | |
| 6,125,008 A * | 9/2000 | Berg et al. | ........................ | 360/264.4 |
| 6,239,938 B1 * | 5/2001 | Boberg et al. | ........................ | 360/75 |
| 7,042,828 B2 | 5/2006 | Kley | | |
| 2004/0027935 A1 * | 2/2004 | Cho et al. | ........................ | 369/43 |
| 2005/0128927 A1 | 6/2005 | Milligan et al. | | |
| 2005/0281174 A1 * | 12/2005 | Gotsmann et al. | ........................ | 369/126 |
| 2007/0147193 A1 * | 6/2007 | Wada et al. | ........................ | 369/44.14 |

FOREIGN PATENT DOCUMENTS

JP            04040677 A   *   2/1992

OTHER PUBLICATIONS

U.S. Appl. No. 11/772,353, filed Jul. 2, 2007, Bonin et al.
N. S. Namachchivaya, "Hopf Bifurcation in the Presence of Both Parametric and External Stochastic Excitations", Journal of Applied Mechanics, vol. 55, Dec. 1988, pp. 923-930.
M. Hirano et al., "Atomistic locking and friction", Physical Review B, vol. 41, No. 17, Jun. 15, 1990, pp. 837-855.
W. Zhong et al., "First-Principles Theory of Atomic-Scale Friction", Physical Review Letters, vol. 64, No. 25, Jun. 18, 1990, pp. 3054-3057.

(Continued)

*Primary Examiner*—Peter Vincent Agustin
(74) *Attorney, Agent, or Firm*—Robert P. Lenart, Esq.; Pietragallo Gordon Alfano Bosick & Raspanti, LLP

(57) ABSTRACT

An apparatus includes a data storage media and a plurality of heads, the data storage media and heads being structured and arranged for relative movement between the heads and storage media causing the heads to move along a scan path, and an actuator for changing a magnitude of head to media force as the heads move along the scan path. A method for reducing head motion hysteresis is also provided.

17 Claims, 7 Drawing Sheets

OTHER PUBLICATIONS

E. Riedo et al., "Interaction Potential and Hopping Dynamics Governing Sliding Friction", Physical Review Letters, vol. 91, No. 8, Aug. 22, 2003, pp. 084502-1-084502-4.

A. Socoliuc et al., "Transition from Stick-Slip to Continuous Sliding in Atomic Friction: Entering a New Regime of Ultralow Friction", Physical Review Letters, vol. 92, No. 13, Apr. 2, 2004, pp. 134301-1-134301-4.

N. Ramakrishnan et al., "Random perturbations of 1:1-resonant systems with SO(2) symmetry", IMA Journal of Applied Mathematics, (2005), pp. 1-21.

A. Socoliuc et al., "Atomic-Scale Control of Friction by Actuation of Nanometer-Sized Contacts", Science, vol. 313, No. 207, Jul. 14, 2006, pp. 207-210.

\* cited by examiner

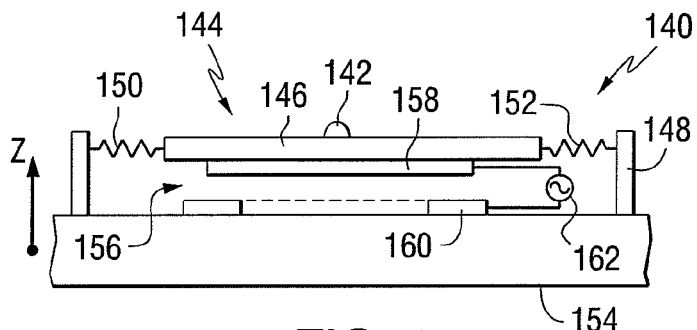
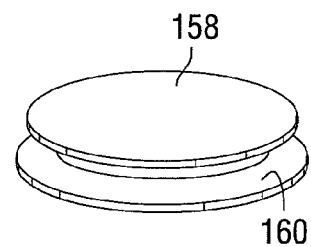
FIG. 9
FIG. 10
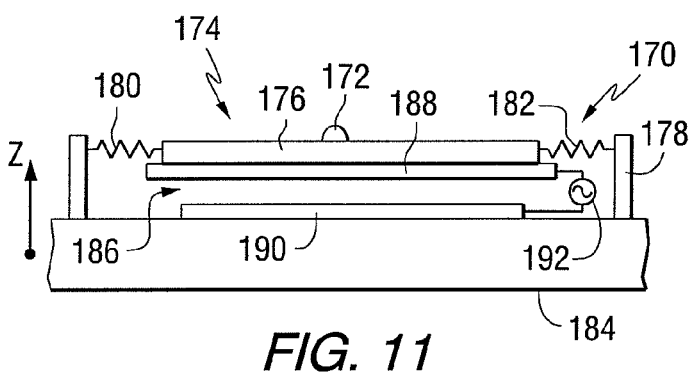
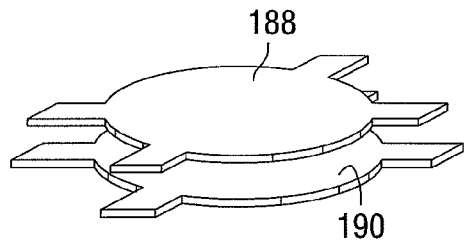
FIG. 11
FIG. 12
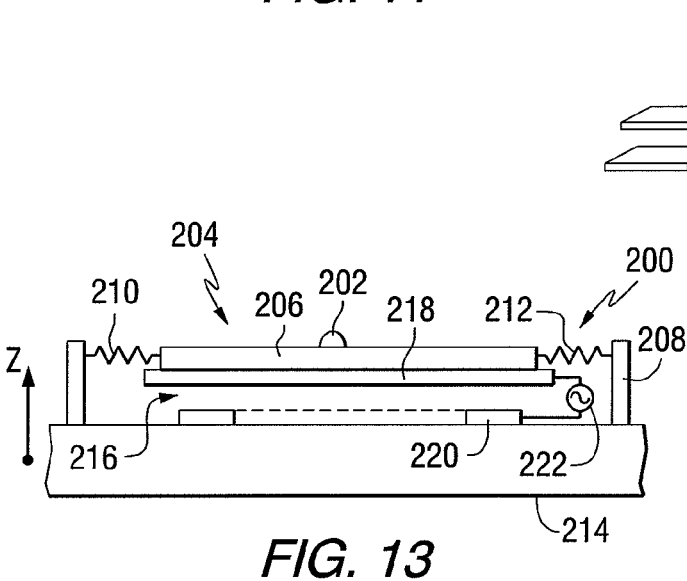
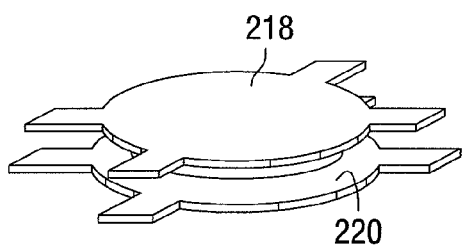
FIG. 13
FIG. 14

PRELOAD MODULATION TO REDUCE HEAD MOTION HYSTERESIS

BACKGROUND

Probe type data storage devices can provide high storage capacity in a very small form factor (e.g., an SD card). Such devices include an array of probe tips, or heads, that are used to read and write data to a storage media, such as a ferroelectric media. Each tip may operate on a specified area of the storage media. Relative movement between the media and the tips can be implemented using actuators, such as electromagnetic actuators or electrostatic actuators, which are coupled to the media or a support structure for the media or the tips. In one example, the media can be moved in first and second directions (i.e., scanning and tracking directions) that are orthogonal to each other. Data are stored in tracks on the storage media. In the scanning direction the actuators may move the media at a resonant frequency to reduce actuation power. In a tracking direction a tracking control is used to enable data storage in a high number of tracks per inch. Simultaneous read-write operations using multiple heads would yield a high data rate.

SUMMARY

In a first aspect, the invention provides an apparatus including a data storage media and a plurality of heads, the data storage media and heads being structured and arranged for relative movement between the heads and storage media causing the heads to move along a scan path, and an actuator for changing a magnitude of head to media force as the heads move along the scan path.

In a second aspect, the invention provides a method including: providing relative movement between a plurality of heads and a storage media, causing the heads to move along a scan path, and changing a magnitude of head to media force as the heads move along the scan path.

These and various other features and advantages will be apparent from a reading of the following detailed description.

BRIEF DESCRIPTION OF THE DRAWINGS

FIG. 9 is a schematic representation of a head assembly.

FIG. 10 is a perspective view of the actuating electrodes of the head assembly of FIG. 9.

FIG. 11 is a schematic representation of a head assembly.

FIG. 12 is a perspective view of the actuating electrodes of the head assembly of FIG. 11.

FIG. 13 is a schematic representation of a head assembly.

FIG. 14 is a perspective view of the actuating electrodes of the head assembly of FIG. 13.

DETAILED DESCRIPTION OF THE INVENTION

Figure 1:
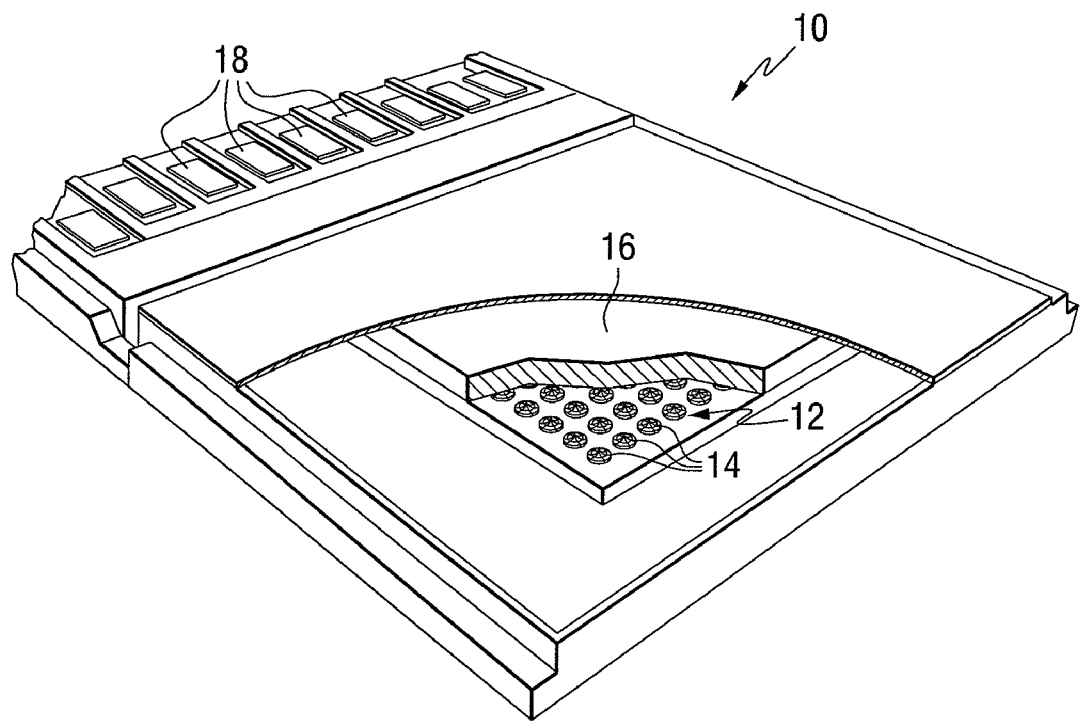
FIG. 1 is a perspective view of an electromagnetically-actuated probe storage device that can be constructed in accordance with an aspect of the invention.

Referring to the drawings, FIG. 1 is a perspective view of a data storage device 10 that can include a capacitive sensor constructed in accordance with an aspect of the invention. In the storage device 10 of FIG. 1, an array 12 of transducers 14, also called probes, tips or heads, are positioned adjacent to a storage media 16. The ends of the transducers 14 and a recording surface of the storage media 16 lie in planes that are generally parallel to each other. The transducers 14 are electrically connected to connectors 18 through control circuitry, not shown. The storage media 16 and/or the transducer array can be coupled to at least one actuator (not shown in this view), which is configured to move the storage media 16 relative to array 12. This movement causes individual storage locations or domains on storage media 16 to be moved relative to the transducers. Each transducer can include one or more electrodes. The storage media in the example of FIG. 1 can be, for example, a ferroelectric, magnetic or optical storage media. However, the invention is not limited to any particular type of storage media.

Multiple heads can be accessed simultaneously to achieve the desired data rate. The data are accessed by moving the media wafer mounted on a sled relative to the head wafer in the data direction (hereafter scanning direction) and stepping between tracks of data (hereafter tracking direction).

Figure 2:
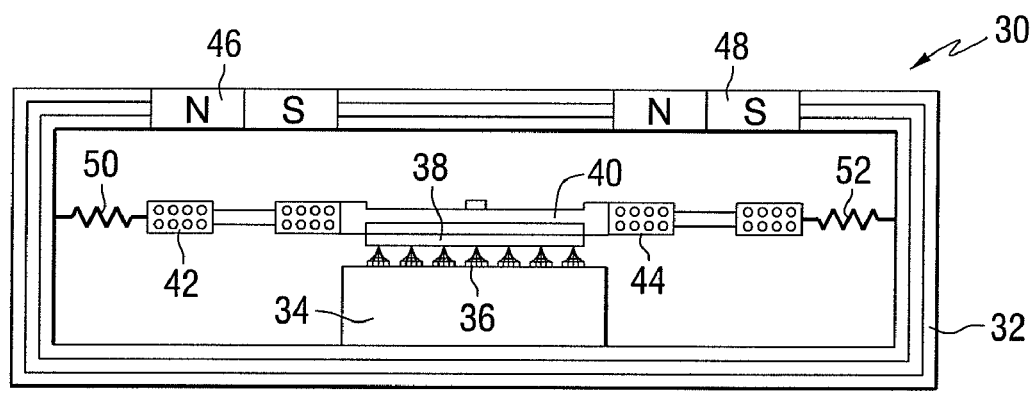
FIG. 2 is a cross-sectional view of a probe storage device.

FIG. 2 is a cross-sectional view of a probe storage device 30 that includes actuators and a suspension assembly for providing relative movement between the storage media and an array of transducers. The device includes an enclosure 32, also referred to as a case, base, or frame, which contains a substrate 34. An array of transducers 36 is positioned on the substrate. In this example, the transducers extend upward to make contact with a storage media 38. The storage media 38 is mounted on a movable member, or sled 40. Relative movement between the storage media and the transducers is provided by electromagnetic actuators that include coils and magnets. Coils 42 and 44 are mounted on the movable member. Magnets 46 and 48 are mounted in the enclosure near the coils. Springs 50 and 52 form part of a suspension assembly that supports the movable member. The enclosure 32 can be formed of, for example, injection molded plastic. While FIG. 2 shows one example of a data storage device, it will be recognized that other known types of suspensions and actuators can be used to position the components and to provide relative movement between the transducers and the storage media. This invention is not limited to devices that use any particular type of transducer and storage media positioning and/or actuating devices.

In one example of a probe type data storage device, 21 tips are accessed simultaneously and the desired track width is 50 nm, which places difficult requirements on the servo system accuracy. In this example, the desired position error may be no more than 2.1 nm at each tip in the face of disturbances.

The simultaneously accessed tips form a row of the overall head array. A row of heads can be used for the simultaneous reading unit because uniform thermal expansion does not generate off-track motion between heads in a row, if yaw misalignment in the scan direction can be actively compensated. The relative position of active heads in an active row is used in determining the relative off-track position error of these heads and determining timing errors during scanning.

For probe storage devices that include ferroelectric storage media, studies indicate that a minimum average pressure (>6 MPa) needs to be maintained at the head-media contact interface to obtain sufficient signal-to-noise ratio (SNR) during read-write operations. This in turn requires the probe heads to be preloaded against the media. The value of the preload force would depend on the minimum contact pressure required at the head-media interface, head stiffness along the normal (i.e., out-of-plane) axis and the geometry of the head, including the contact area and distribution of contact pressure. For one variant of a head design, the preload requirement translates to a normal contact force of 24 μN.

Friction during contact sliding of the probe heads against the media can cause in-plane displacement of the individual heads in the plane of contact. The motion response of individual probe heads can vary depending on local variations (e.g., head-to-head variations) in the head preload force, head stiffness and interface conditions (i.e., the friction/stiction coefficient), and also variations of these parameters over time. This may result in indeterminacy in the relative position between heads in an active row during read-write operations. The end result can be timing errors during scanning, and off-track position errors. These effects would be most significant during continuous scanning such as during sequential read-write operations, and long or full-stroke seeks.

The residual error between a given displacement of the media-sled and the corresponding displacement of a head due to the combination of head-media friction/stiction with head in-plane stiffness is referred to as head motion hysteresis. Differences in head motion hysteresis between heads in the array due to temporal variations in the local contact conditions (such as contact pressure distribution, contact area, roughness, adhesion, etc.) is herein referred to as relative head motion hysteresis.

Figure 3:
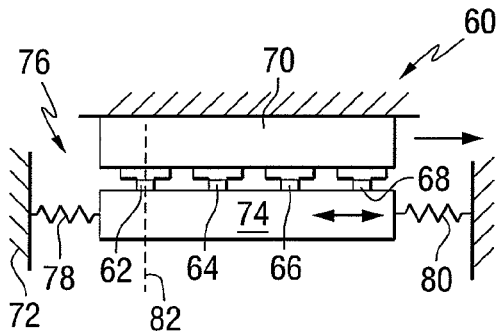
FIGS. 3 through 6 are schematic diagrams illustrating relative movement between a plurality of heads and a storage medium.
Figure 4:
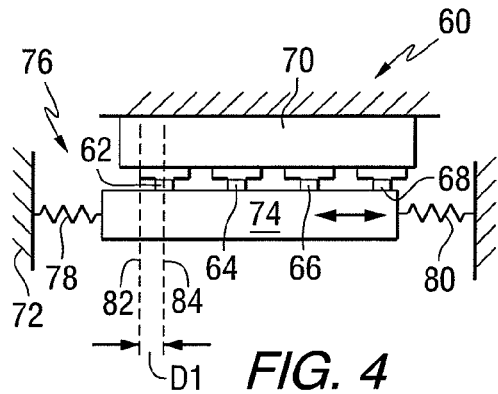

A first example of head motion hysteresis is illustrated in FIGS. 3 and 4. In FIGS. 3 and 4, the effect of head-media friction in the aftermath of a physical shock event is shown. FIG. 3 shows data storage device 60 including a plurality of heads 62, 64, 66 and 68 mounted on a head substrate 70. The head substrate is fixed to a frame 72. A storage media 74 is coupled to the frame by a suspension assembly 76 including springs 78 and 80. In FIG. 3, head 62 is located at a position centered along line 82. FIG. 4 shows the storage device of FIG. 3 after the media has moved due to an external disturbance, such as a physical shock event. Friction and/or stiction between the heads and the media prevents the media from returning to the original position relative to the heads. In this example head 62 is located at a position centered along line 84. Thus the media has been displaced by a hysteresis displacement of D1.

FIGS. 3 and 4 illustrate the friction at the head-media interface, preventing the heads from returning to their original positions relative to the media after a shock event, which displaces the media relative to the head array. Individual displacements of the heads vary with variations in friction/stiction, head stiffness and preload from head-to-head.

Figure 5:
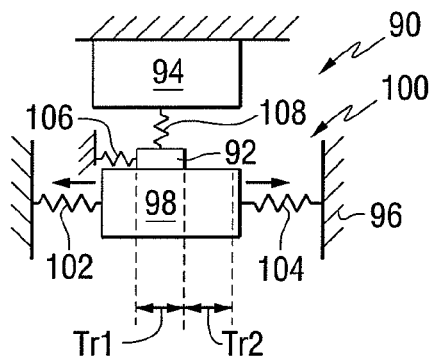
Figure 6:
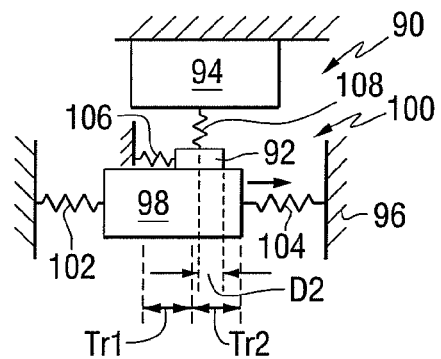

A second example of head motion hysteresis is illustrated in FIGS. 5 and 6. In FIGS. 5 and 6, the effect of head-media friction in the aftermath of an intentional movement of the media is shown. FIG. 5 shows data storage device 90 including a head 92 mounted on a head substrate 94. The head substrate is fixed to a frame 96. A storage media 98 is coupled to the frame by a suspension assembly 100 including springs 102 and 104. The head 92 is positioned on track Tr1. Springs 106 and 108 represent a head mounting structure. FIG. 6 shows the storage device of FIG. 5 after the media has moved in a tracking direction. Friction and/or stiction between the heads and the media prevents the head from moving into alignment with track Tr2. In this example the media has been displaced by one track width.

FIG. 5 shows the head positioned on track Tr1. FIG. 6 depicts the condition in which the media is moved by one track pitch relative to the head array. Ideally the head would be centered now on track Tr2. However, due to friction/stiction counteracting some of the restoring elastic force in the head structure, the new equilibrium position of the head has a residual position error relative to track Tr2. This error, D2 in FIG. 6, is the head motion hysteresis.

FIGS. 5 and 6 illustrate the effect of head-media friction when the media slides against the heads in the tracking direction. The hysteresis induced in the head motion causes tracking errors (e.g., off-track errors, or track misregistration (TMR)). Furthermore, the variations in the hysteresis response between individual heads in a row cause indeterminacy in the tracking position of the active row of heads.

In FIGS. 5 and 6, head-media friction causes a resultant head motion hysteresis at the end of the seek that results in off-track position error. The off-track position error is the distance D2 between the center of the head 92 and the center of track Tr2. Head-to-head and temporal variations in the hysteresis response can cause positional indeterminacy across a row of heads.

Factors contributing to relative hysteresis resulting from different head motion responses from head-to-head, include head-to-head variations in preload, head in-plane stiffness, head stiffness in the normal (i.e., out-of-plane) direction, and local variations in friction and stiction. Variations over time of the spatial (i.e., over the head array) distributions of these quantities are important in determining the dynamic relative hysteresis response during scanning and seeking.

In one aspect, the apparatus and method of this invention can be used to actively mitigate the relative hysteresis response. Modulation of the head preload force (also called the head-media normal contact force) can be used to enable partial or total relaxation of the elastic hysteresis built up in the head structures during scanning or seeking.

As used in this description, modulation refers to imposed changes in head preload force. Modulation can be periodic or non-periodic, and can have any arbitrary variation over a finite interval of time. Preload oscillation refers to the periodic oscillation of the head preload force about its nominal value.

The described methods for actively mitigating the relative hysteresis response can be generally referred to as preload modulation schemes. Modulation of the head-media contact force and reduction of the normal contact force to zero can be achieved without requiring the head to be lifted off the media surface. In the examples discussed below, modulation of the normal head-media contact force is achieved by applying a restoring force on the heads by external means such as using electrostatic actuators. As used herein, a restoring force is the force applied to partially or wholly counteract the nominal head preload force. Separate preload modulation schemes can be used for seek-settle and scanning functions.

In the examples described here, a preload force is applied normal to the plane of the head structure in the load direction.

The preload force is modulated by changing the magnitude of the preload force or removing the preload force. The load direction is defined as the vector normal to the head-media contact area pointing away from the head structure and into the media.

The described preload modulation schemes are applicable to any type of head design including button head and cantilever head designs. In various examples, preload modulation can be achieved using actuation of the head structure along the load direction.

Figure 7:
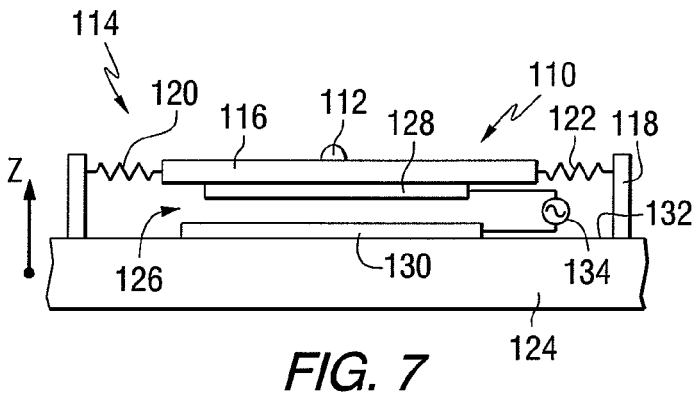
FIG. 7 is a schematic representation of a head assembly.
Figure 8:
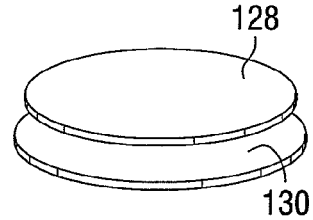
FIG. 8 is a perspective view of the actuating electrodes of the head assembly of FIG. 7.

Various types of actuators can be used to apply the preload force. FIG. 7 is a schematic representation of a head assembly 110. The head assembly 110 includes a head electrode 112 mounted on a suspension assembly 114. The suspension assembly includes a base 116 coupled to a support structure 118 using spring members 120 and 122. The support structure is mounted on a head substrate 124. An electrostatic actuator 126 is used to apply a force to the head electrode in the Z-direction. The electrostatic actuator includes electrodes 128 and 130. A voltage can be applied between the actuator electrodes to produce the desired force in a direction substantially perpendicular to the top surface 132 of the head substrate, as illustrated by voltage source 134. FIG. 8 is a perspective view of the actuating electrodes 128 and 130 of the head assembly of FIG. 7.

In the example illustrated in FIGS. 7 and 8, an electrode is deposited on the backside of the base of the suspension assembly and one or more mating electrodes are placed on the head substrate to form a parallel plate capacitor. The force between the plates of a parallel plate capacitor is given by $$F(z) = \frac{1}{2}\frac{dC(z)}{dz}V^2, \quad (1)$$

where C is the parallel plate capacitance, z is the distance between the plates, and V is the potential difference between the plates. The capacitance of a parallel plate capacitor is $$C(z) = \frac{\varepsilon_0 A}{z}, \quad (2)$$

where A is the area of overlap of the plates and $\varepsilon_0$ is the permittivity of free space. Taking the derivative of equation (2) with respect to z and substitution into equation (1) yields $$F(z) = -\frac{\varepsilon_0 A V^2}{2z^2}. \quad (3)$$

The gap between the head structure and the head substrate, the area of the electrode, and the voltage applied to the actuator may be modified to achieve the desired actuation force. For example, the head structure may have a backside area of 2500 μm². A high voltage (e.g., about 100 V) may be used to drive the electrostatic actuator. Using this as the drive voltage and the entire backside area for the electrode as an example, the gap between the head substrate and the backside of the head structure can be set to 2.7 μm to achieve the desired force of 15 μN.

FIGS. 7 and 8 illustrate electrostatic Z-direction actuation of the head, which is one of many means for modulating the head preload force to reduce the effects of head motion hysteresis.

FIG. 9 is a schematic representation of another head assembly 140. The head assembly 140 includes a head electrode 142 mounted on a suspension assembly 144. The suspension assembly includes a base 146 coupled to a support structure 148 using spring members 150 and 152. The support structure is mounted on a head substrate 154. An electrostatic actuator 156 is used to apply a force to the head electrode in the Z-direction. The electrostatic actuator includes electrodes 158 and 160. A voltage can be applied between the actuator electrodes to produce the desired force in the Z-direction, as illustrated by voltage source 162. FIG. 10 is a perspective view of the actuating electrodes 158 and 160 of the head assembly of FIG. 9. Electrode 160 in FIGS. 9 and 10 is in the form of an actuator ring.

FIG. 11 is a schematic representation of a head assembly 170. The head assembly 170 includes a head electrode 172 mounted on a suspension assembly 174. The suspension assembly includes a base 176 coupled to a support structure 178 using spring members 180 and 182. The support structure is mounted on a head substrate 184. An electrostatic actuator 186 is used to apply a force to the head electrode in the Z-direction. The electrostatic actuator includes electrodes 188 and 190. A voltage can be applied between the actuator electrodes to produce the desired force in the Z-direction, as illustrated by voltage source 192. FIG. 12 is a perspective view of the actuating electrodes 188 and 190 of the head assembly of FIG. 11. FIGS. 11 and 12 show an expanded actuator with electrodes on springs. This design lowers the voltage required for a given actuation force. The area on the underside of the springs could be used additionally for generating actuation force. For instance, metal electrodes may be deposited on the underside of MEMS-fabricated springs.

FIG. 13 is a schematic representation of another head assembly 200. The head assembly 200 includes a head electrode 202 mounted on a suspension assembly 204. The suspension assembly includes a base 206 coupled to a support structure 208 using spring members 210 and 212. The support structure is mounted on a head substrate 214. An electrostatic actuator 216 is used to apply a force to the head electrode in the Z-direction. The electrostatic actuator includes electrodes 218 and 220. A voltage can be applied between the actuator electrodes to produce the desired force in the Z-direction, as illustrated by voltage source 222. FIG. 14 is a perspective view of the actuating electrodes 218 and 220 of the head assembly of FIG. 13. FIGS. 13 and 14 show an actuation ring with electrodes on springs. This design may improve stability and increase the Z-actuation force, while and at the same time lowering the voltage requirement. The area on the underside of the springs could be used additionally for generating actuation force. For instance, metal electrodes may be deposited on the underside of MEMS-fabricated springs.

Preload oscillation meeting these requirements can be produced, for instance, by changing the voltage applied to the electrodes of an electrostatic actuator. Given the low values of force required, the power requirement for head actuation in order to carry out preload modulation may be of the order of 0.225 micro-Watt per head or about 4.50 micro-Watt for preload modulation for a set of 21 active heads, assuming a maximum head preload compression of 3 microns.

While the examples of FIGS. 7-14 show electrostatic actuators, it should be apparent that the head actuation used for preload modulation can be achieved by a number of means that include but are not limited to, (1) electrostatic actuators, (b) thermal actuators, (c) piezoelectric, and (d) electro-rheological fluid actuators. The actuation force can be, for example, about 15 μN. The actuation bandwidth can be, for example, about 5000 Hz.

Figure 15:
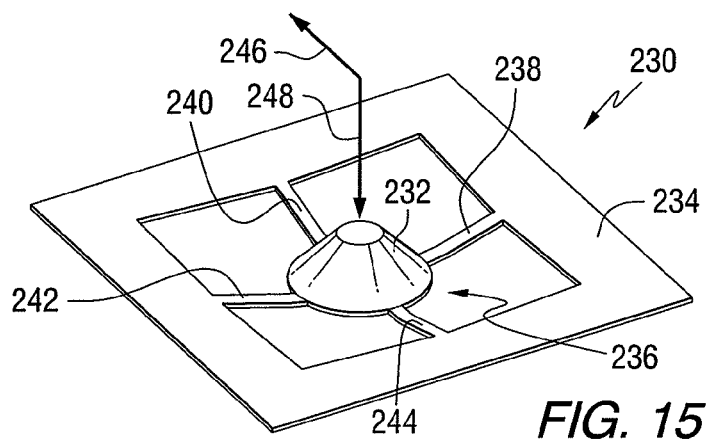
FIG. 15 is a perspective view of a head assembly.

FIG. 15 is a perspective view of another head assembly 230 including an electrode 232 coupled to a support structure 234 by a suspension assembly 236 including a plurality of spring arms 238, 240, 242 and 244. A scan direction is illustrated by arrow 246 and a load direction is illustrated by arrow 248.

In one aspect, the invention provides modulation of the preload force during continuous scanning. Scanning can include relative movement of the probe heads in substantially straight segments (or strokes) with the substantially straight segments being connected by turnaround segments (also called dead zones). Variations of the preload force modulation include: scheme (a) in which preload force is released or reduced during turnaround at the ends of the strokes; scheme (b) in which a continuous preload force oscillates during scanning; and scheme (c) in which the preload force is relaxed at the ends of strokes. In other examples, variation (a) can be combined with continuous preload oscillation during scanning (i.e., variation (b)). In addition, preload force oscillation alone (i.e., scheme (b)) can be used for single scans.

Figure 16:
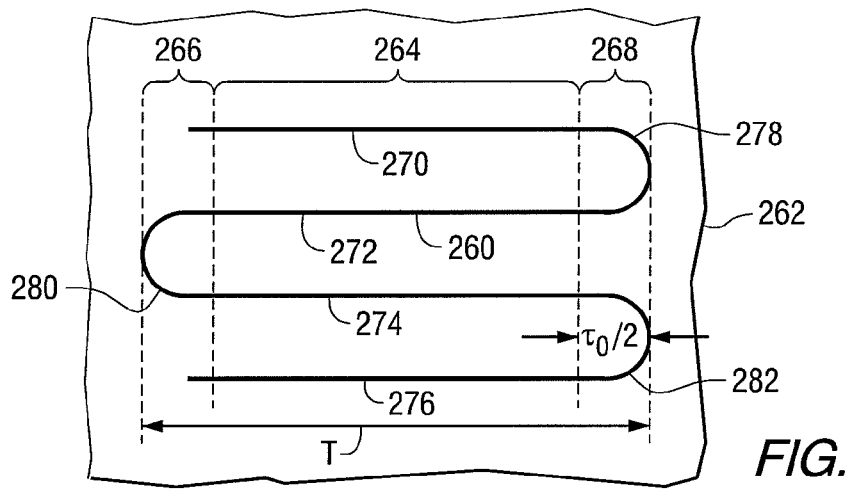
FIG. 16 is a schematic illustration of a scan path.

The data storage media and the heads can be mounted in an assembly that is structured and arranged to produce relative movement of the head and the media along a scan path. FIG. 16 is a schematic illustration of a scan path 260 over a portion of a storage media 262. The scan path includes substantially straight portions that pass over a data storage region 264 and curved portions where the path turns over dead zones 266 and 268. Substantially straight portions 270, 272, 274 and 276 of the path represent data scans. The substantially straight portions are connected by curved turnaround portions 278, 280 and 282. In one aspect, the invention uses a reduction or release of the preload force at the ends of the stroke (i.e., over the dead zones) to reduce the effect of stiction on the relative head motion hysteresis.

While this reduces the built-up elastic hysteresis in the head structures during the turnaround phase of the scan cycle, it is desirable to minimize the width of the dead zones to improve recording format efficiency. Continuous preload oscillation during the data scan can be used to further reduce the effect of dynamic friction on hysteresis build-up.

Figure 17:
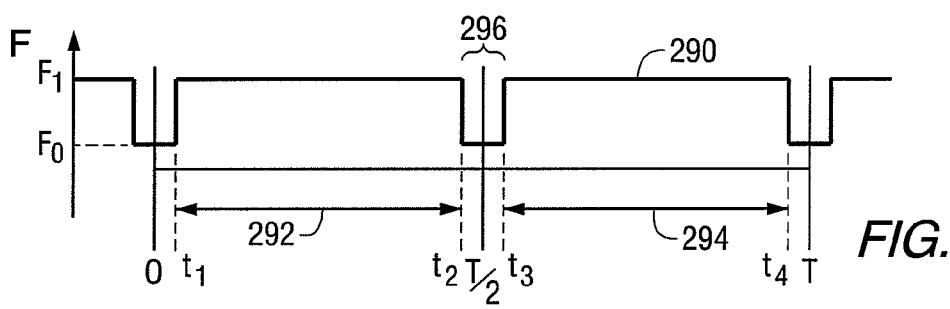
FIG. 17 is a graph of preload force versus time during a scan period.

An example of a preload force profile over one time period of scanning is illustrated in FIG. 17. Trace 290 illustrates the application of a preload force F. At time t=0, the preload force F is zero or a relatively low value $F_0$. At time $t_1$, the head begins to scan the data bits along a data track, and the preload force is increased to a value $F_1$. The preload force $F_1$ is applied until time $t_2$, at which time the head reaches the end of its stroke and the preload force is reduced to $F_0$. At time $t_3$, the head again begins to scan the data bits in the reverse direction, and the preload force is applied again. The preload force is applied until time $t_4$, at which time the head reaches the end of the data track and the preload force is reduced to $F_0$. FIG. 17 shows times at which a preload force is applied during a scan function. The applied preload force can be a constant value, or the magnitude of the preload force can have a variable or oscillating value. FIG. 17 illustrates a profile of preload variation over time during one scan cycle. Preload is reduced or completely released during the turnaround phase.

Head preload reduction or release over the dead zones or turnaround zones at the ends of the stroke reduces the effect of stiction and therefore partially or completely mitigates the effect of stiction on relative head motion hysteresis. The extent of preload reduction over the dead zone and the width of the dead zone together determine the reduction of the hysteresis response.

Figure 18:
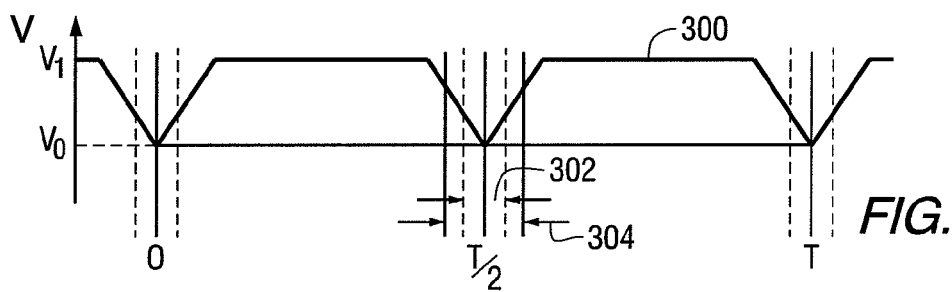
FIGS. 18 and 19 are graphs of velocity versus time during a scan period.

The width of the dead zone relative to the portion of the stroke over which stiction effects are significant at the ends of the stroke is an important consideration in the optimal implementation of this scheme. FIG. 18 illustrates a first velocity profile 300 in which the dead zone width is less than a stiction zone width. In this case the effect of stiction on relative head motion hysteresis is partially mitigated through preload modulation over the dead zones.

Figure 19:
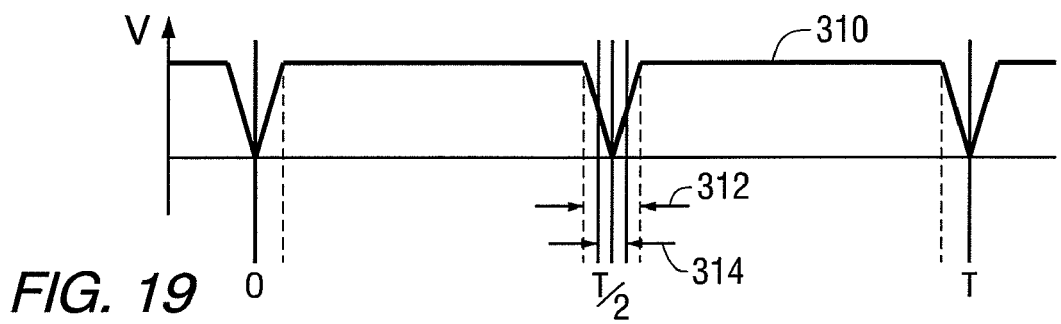

FIG. 19 illustrates a second velocity profile 302 in which the dead zone width is greater than a stiction zone width. In this case the effect of stiction over the turnaround zones is completely eliminated.

Additional reduction in the relative hysteresis response between any two heads in the array can be obtained using continuous oscillation of the preload force magnitude during scanning over the data zone (e.g., when reading or writing data bits). Continuous preload oscillation during data scan relaxes the head motion hysteresis build-up in each of the heads and therefore helps to mitigate the relative head motion hysteresis further. The frequency and amplitude of preload oscillation are important factors determining the optimal effectiveness of this scheme.

A sinusoidal variation of the preload force amplitude has been assumed for modeling and simulations. However, it will be apparent that any periodic variation of the head preload force can be applied, in principle. The sinusoidal variation, however, has the advantage of providing a smoother variation compared to, for instance, a square pulse variation with smoothing of the corners. This avoids the effects of possible parasitic excitation due to the broadband frequency content of non-sinusoidal waveforms.

The sinusoidal variation of the preload force amplitude can be applied by applying a sinusoidal voltage to the actuator electrodes. This could, for instance, be implemented by applying a sinusoidally varying voltage across the electrodes of an electrostatic actuator. The amplitude of the sinusoidal voltage signal would be determined by the required amplitude of preload variation. This, in turn, along with the frequency of the sinusoidal variation would be determined by a tradeoff between the reduction in relative head motion hysteresis and the additional noise and signal-loss that may be introduced in the recording channel. The frequency of sinusoidal preload oscillation is assumed to be constant in the modeling. Since it is desirable to have a constant scanning velocity across the scan-stroke during read-write operations, a uniform optimal frequency of preload oscillation is likely to yield the best results. An optimal set of preload oscillation frequencies can be constituted however, in the general case where there are variations of preload force and or scanning velocity across the stroke.

Estimates based on modeling predict that a combination of preload force release or reduction during turnaround portions of a scan and continuous preload oscillation during scanning can yield as much as 37% reduction in the relative hysteresis amplitude and therefore a 37% reduction in timing error. For a preload variation (sinusoidal) amplitude of ±20% of the mean preload value, the reduction in relative hysteresis amplitude and therefore the reduction in timing error is estimated to be 20%.

The estimates stated above assume a stiction zone of width equal to 5% of the scan period and a dead zone width of 2% of the scan period, assuming a constant scan velocity over the data zone.

Increasing the width of the dead zone may significantly improve the reduction in hysteresis response. For instance, it is estimated that increasing the dead zone width from 0.02 T to 0.035 T (where T is the time period of one scan cycle) improves the reduction in relative hysteresis response from 20% to 37%. The optimal dead zone width can be chosen based on a trade-off between bit length or areal density on one hand and reduction in relative hysteresis response on the other.

Similarly, preload modulation during seek-settle is predicted to reduce relative hysteresis response amplitude by at least 25%. "Seek-settle" refers to the coarse motion (e.g., seek) followed by track-settle.

The reduction in head motion hysteresis of the order expected using the described preload modulation schemes would result in reduced positional indeterminacy amongst the active heads, and therefore reduced off-track TMR while tracking and seeking and reduced timing errors during scanning. This would, in turn, enhance performance of the storage device by reducing bit errors, increasing data rate during scanning, and improving seek-settle performance; hence improve access time and tracking ability.

Using low frequency of preload modulation may result in low power consumption. Additionally, the preload modulation can be implemented using relatively inexpensive and simple control and power electronics.

In one aspect, a method provides a continuous preload oscillation during continuous scanning. In this aspect, the head preload is varied continuously in a periodic (for instance, sinusoidal) fashion at an optimal frequency. This allows partial relaxation of the relative head motion hysteresis, thus reducing the magnitude of timing error during scanning.

Figure 20:
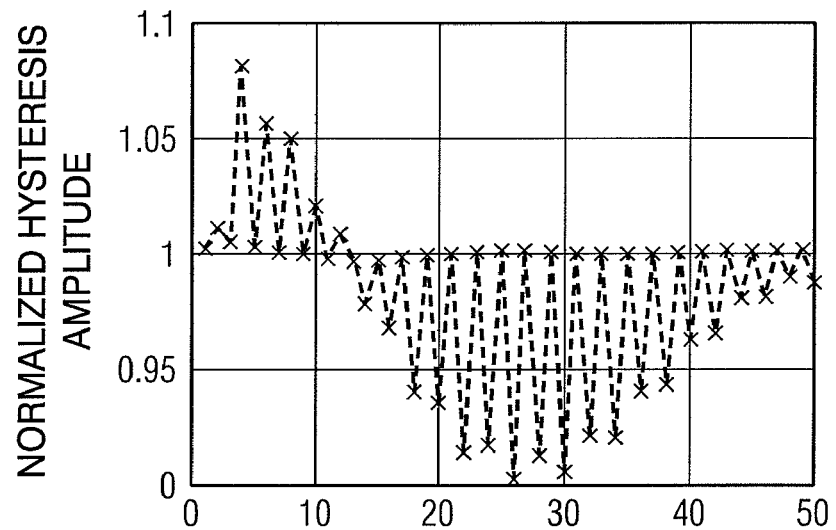
FIG. 20 is a graph of normalized preload force versus ratio of preload oscillation to scan frequency.

FIG. 20 shows the variation of the magnitude of normalized relative hysteresis amplitude versus the ratio of preload oscillation frequency to scan frequency for a normalized preload oscillation amplitude of 0.2 (i.e., normalized with respect to the nominal preload force amplitude). In this example, the hysteresis amplitude was normalized with respect to the magnitude for a case with no preload modulation. The graph shows data for a preload force oscillation with an amplitude of 20% of average preload force. In FIG. 20, the X's represent the computed normalized amplitude. The connecting dotted lines do not represent interpolated values.

For the system considered in this example, it is clear from FIG. 20 that the optimal preload oscillation frequency is about $26*\omega_{osc}$, where $\omega_{osc}$ is the scan frequency. The reduction in relative hysteresis energy for this case (i.e., a preload force oscillation amplitude of 20% of the mean preload force value) is estimated to be about 10%. In one case with a preload oscillation amplitude 100% of mean value, model simulations predict a reduction of relative hysteresis energy of 37%. These improvements would be greater if stiction effects are less dominant than what was assumed in the model.

The normalized response amplitude in FIG. 20 shows an oscillating behavior going from odd to even multiples of the scan frequency. This is because of the preload oscillation manifesting a subharmonic resonance at even harmonics of the scan frequency in the stationary response of the averaged stochastic system.

Figure 21:
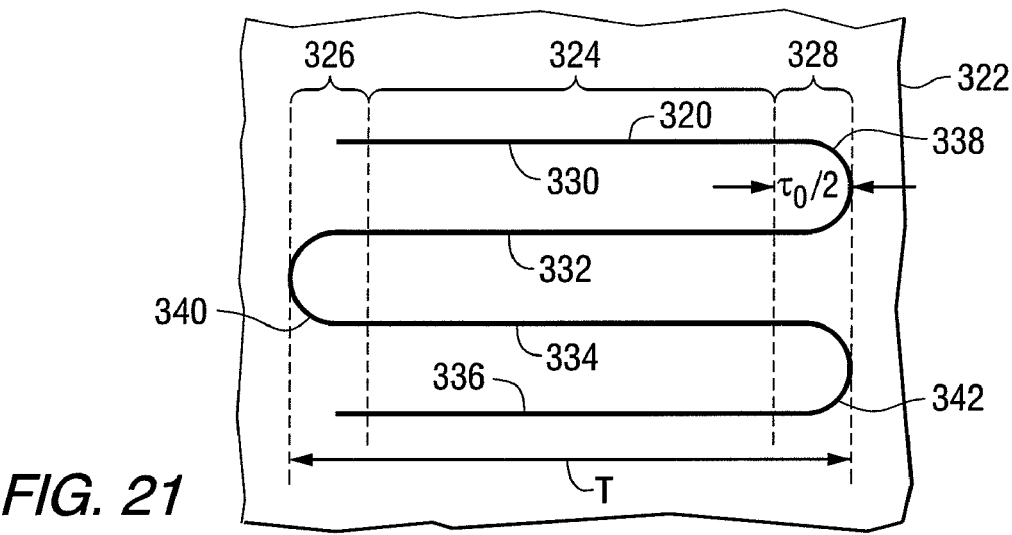
FIG. 21 is a schematic illustration of a scan path.

In another aspect, the invention uses preload modulation at ends of a stroke during continuous scanning. In this aspect, the preload force can be reduced or completely released at the ends of the stroke. FIG. 21 is a schematic illustration of a scan path 320 over a portion of a storage media 322. The scan path includes substantially straight portions that pass over a data storage region 324, and curved portions where the path turns over dead zones 326 and 328. Substantially straight portions 330, 332, 334 and 336 of the path represent data scans. The substantially straight portions are connected by curved turnaround portions 338, 340 and 342.

Dead zones are added at the ends of the stroke that overlap partially or completely with the ramp-up/ramp-down phase and turnaround phase of head motion relative to the media at the ends of a scan, as shown in FIG. 21. The preload is reduced or completely released during the dead zone phase of the scan cycle. Preload relaxation during the turnaround phase reduces the effect of stiction on the relative head motion hysteresis. Increasing the dead zone width would reduce the relative hysteresis amplitude until a point where it equals the width of the stiction zone.

FIG. 21 is a schematic representation of a continuous scan wherein dead zones are added at the ends of the strokes. When the head is in the dead zones, the head preload is reduced or released completely. Preload relaxation over these dead zones reduces the effect of stiction on relative head motion hysteresis.

The preload modulation in this scheme is illustrated in FIGS. 17 and 18. FIG. 17 shows the modulation of the preload force over a scan cycle. FIG. 18 shows a possible scenario of scan velocity profile. Reduction or release of head preload over the dead zones reduces the effect of stiction on relative head motion hysteresis.

FIGS. 17 and 18 are schematic representations of preload modulation at the ends of the stroke to reduce the effect of stiction on relative head motion hysteresis.

FIGS. 18 and 19 illustrate two scenarios, one of which has a dead zone width that is narrower than the stiction zones at the ends of the stroke, and the other having a dead zone width that is wider than the stiction zone. In the latter case the effect of stiction is mitigated by the preload modulation to a larger extent than in the former case. Increasing the dead zone width reduces the relative hysteresis magnitude to a greater extent. However increased dead zone width results in shorter bit length and consequently higher areal density requirement for a given device storage capacity and data rate. An optimal dead zone width can be chosen based on trade-offs between areal density/bit length and desired reduction in relative head motion hysteresis and based on observed effective range of stiction.

FIGS. 18 and 19 show that the relative width of dead zone and stiction zone has a significant effect on reduction of relative head motion hysteresis. The stiction zone width is determined by the velocity profile during scanning.

Table 1 summarizes the reduction that can be achieved using preload modulation at the ends of the stroke for various dead zone widths. Clearly the maximum improvement is gained when the dead zone width is equal or greater than the stiction zone width.

TABLE 1

| Stiction zone width | Dead zone width | % Improvement in relative hysteresis (with respect to a case of no preload modulation) |
| --- | --- | --- |
| 0.05 T | 0.02 T | 13% |
| 0.05 T | 0.035 T | 24% |
| 0.05 T | 0.05 T | 37% |

Table 1 shows the percentage reduction in relative hysteresis amplitude for various ratios of dead zone width and stiction zone width. Increasing the dead zone width improves the reduction in relative hysteresis. However this would also result in increased areal density and reduced bit length requirements.

In another aspect, the invention provides preload force modulation at the ends of the stroke combined with continuous preload force oscillation during continuous scanning. The preload force is reduced or released completely at the ends of the stroke, and a continuous preload oscillation is applied while scanning over the data zone (during read-write operation).

Figure 22:
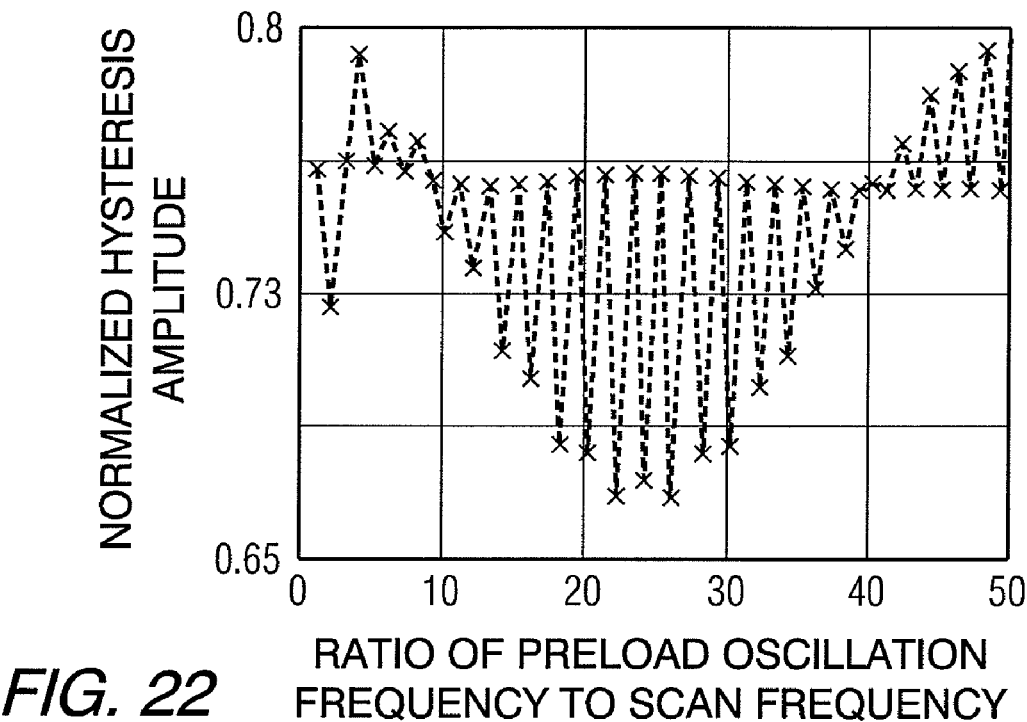
FIG. 22 is a graph of normalized preload force versus ratio of preload oscillation to scan frequency.

FIG. 22 shows a plot of the normalized relative head motion hysteresis energy versus the preload oscillation frequency for a normalized preload force with an oscillation amplitude of 0.2. In FIG. 22, the relative head motion is normalized with respect to hysteresis amplitude with no preload modulation. The dead zone width in this case is 0.02 T, while the stiction zone width is assumed to be 0.05 T. The preload oscillation amplitude is assumed to be 20% of the mean preload value. In this case the optimal frequency of preload oscillation is predicted to be $26*\omega_{osc}$, and the reduction in relative head hysteresis is estimated to be 20%. Increasing the width of the dead zone yields a greater reduction in relative head motion hysteresis. For example, increasing the dead zone width from 0.02 T to 0.035 T while keeping the preload oscillation parameters the same improves the reduction in relative hysteresis amplitude from 20% to 27%. In FIG. 22, the connecting dotted lines do not represent interpolated values.

Increasing the preload oscillation amplitude further improves the reduction in relative hysteresis. The effect of preload oscillation amplitude on reduction of the relative head motion hysteresis is plotted in FIG. 23. Increasing the preload oscillation amplitude to 0.50, for instance, results in a reduction of relative hysteresis amplitude up to 25.5%. However, a large amplitude of preload variation may result in significant degradation of signal-to-noise ratio (SNR) during read-write operation and also cause undesired modulation of the read-write signal. An optimal preload oscillation amplitude that yields the maximal reduction in relative hysteresis response, while not degrading read-write performance (SNR), can be determined and chosen through careful calibration of the performance sensitivity to preload oscillation amplitude.

Figure 23:
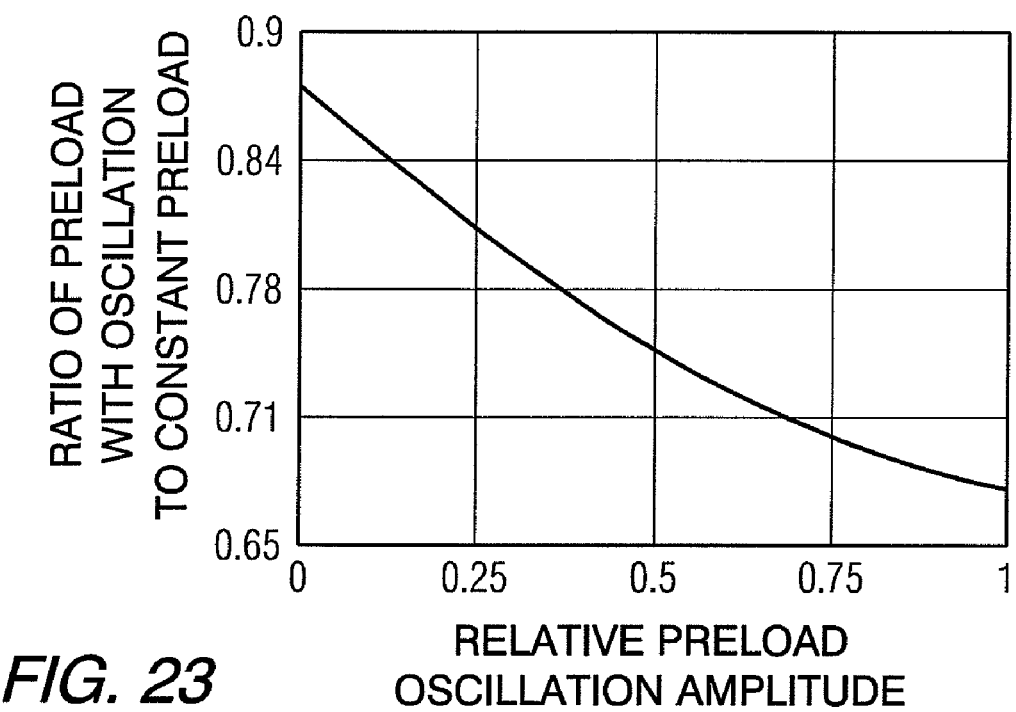
FIG. 23 is a graph showing hysteresis reduction with preload force oscillation.

FIG. 23 is a graph showing the variation of normalized relative hysteresis amplitude (with respect to the value for the no preload modulation case) with relative preload oscillation amplitude (with respect to the mean preload). The dead zone=0.02 T, and the stiction zone=0.05 T.

A comparison of the reduction in hysteresis amplitude for various cases involving different levels of preload modulation and for various dead zone widths is summarized in Table 2.

As seen in Table 2, preload modulation at the ends of the stroke with continuous preload oscillation during continuous scanning yields the most reduction in relative hysteresis response. Furthermore, that scheme is most useful in cases when the variations over time in dynamic friction are of the same order of magnitude as the variations in stiction. In cases where stiction dominates the hysteresis behavior, it would be most cost-effective to use preload modulation at the ends of the stroke during continuous scanning.

Continuous preload oscillation is the most cost-effective when dynamic friction effects are commensurate with stiction effects and the stiction zone is relatively narrow. This, for instance, would be the case when ramp-up and ramp-down of scan velocity is steep. Continuous preload oscillation is also useful for single scans.

TABLE 2

| Preload modulation scheme | Stiction zone width | Dead zone width | % Improvement in relative hysteresis (w.r.t case of no preload modulation) |
|---|---|---|---|
| Continuous preload oscillation amplitude 20% of mean preload | 0.05 T | 0 | 5% |
| Preload modulation at the ends of the stroke during continuous scanning | 0.05 T | 0.02 T | 13% |
| Preload modulation at the ends of the stroke during continuous scanning | 0.05 T | 0.035 T | 24% |
| Preload modulation at the ends of the stroke with continuous preload oscillation during scanning over data zone - preload oscillation amplitude 20% of mean preload | 0.05 T | 0.02 T | 20% |
| Preload modulation at the ends of the stroke with preload oscillation during scanning over data zone - preload oscillation amplitude 20% of mean preload | 0.05 T | 0.035 T | 27% |

In another aspect, the invention provides methods for reducing relative head motion hysteresis during movement of a head between two locations including a seek phase and a settle phase. During the seek phase the head moves between data tracks. Once the head is positioned over a desired data track, a settle phase occurs in which the head will settle to the desired position to enable reading from, or writing to, the storage media. The scan-path during seek-settle is along the cross-track axis and the scan-path during scanning is along a track.

As used herein, the seek time is the amount of time required for the read/write heads to move between tracks over the surfaces of the storage media. The settle time refers to the amount of time required after the head assembly has moved during a seek for the heads to stabilize sufficiently for the data to begin to be read.

To reduce head motion hysteresis, preload modulation can be applied in several ways during full-stroke or other types of long seeks. In one example, the invention provides a zero or reduced preload during the seek phase. Coarse position sensing during seeking in the storage device may be controlled using capacitive sensors, while fine positioning used for tracking control may be controlled using embedded servo marks.

In one example, a preload force would be applied to a head just before transitioning from the seek phase, wherein position sensing is controlled using capacitive sensor-based position sensing to the settle phase, wherein position sensing is controlled using embedded servo marks. This enables the heads to read the embedded servo marks during the settle phase. Reduced or fully released preload during the seek phase reduces the build-up of head motion hysteresis.

In another example, a continuous preload oscillation can be applied during the seek phase and the settle phase. More generally, preload force oscillation may be applied during either or both phases. The frequency and amplitude of preload force oscillation during the seek and settle phases can be different.

In another example, a zero or reduced preload force can be applied during the seek phase followed by transition to full preload just before transition to the settle phase combined with continuous preload oscillation during the settle phase.

In another example, preload force oscillation may be applied continuously during short seeks. A short seek can be, for example, <5% of a full-stroke.

Preload oscillation relaxes the elastic head deformation to reduce the head motion hysteresis by applying a periodic variation to the head preload force. By applying preload oscillation, or more generally preload modulation to the entire set of active heads, the relative head motion response is reduced.

The preload force on the heads that are not active at any given time may be partially or completely released in order to reduce friction at the head substrate-media interface, thereby reducing actuation force and power requirements.

When using preload modulation during a seek phase, relative head motion hysteresis becomes most dominant during full-stroke or long seeks and could cause large positional indeterminacy of the active heads relative to each other. Long seeks can generally be split up into a seek phase involving closed-loop controlled motion along a predefined trajectory from the origin to the destination track and a slower settle phase wherein the target position is achieved more finely and accurately. Generally the seek phase requires relatively coarser position sensing and control, whereas the settle phase requires higher resolution position sensing and control.

A relatively coarse position sensing scheme such as one using capacitive sensors can be used during the seek phase, and a finer-resolution position sensing using embedded servo marks can be used during the settle phase. This eliminates the need for head-media contact during the seek phase. Therefore, in this scheme the head preload force can be reduced or completely released during the seek phase, and full preload force restored just before transitioning from the coarse position sensing stage (i.e., the seek phase) to the settle phase, wherein embedded servo marks are used for position sensing.

For the same system considered in the examples described above, the RMS value of the relative hysteresis response during the settle phase for the case of full head preload during seek-settle is estimated to be 3.1 nm. Head preload force can be completely released during the seek phase, while 100% head preload force is applied during the settle phase. In one example, the RMS value of hysteresis response during settle reduces from 3.1 nm to 1.6 nm.

Transition from zero preload during the seek phase to full preload just before the transition to the settle phase can be carried out smoothly using appropriately controlled preload actuation of the heads. This would mitigate any effects of abrasive type of wear during the head preload process in the transition phase and also reduce the effects of transient response during the transition.

In cases where the head actuation design is not capable of releasing the preload completely or close to 100%, a continuous preload oscillation can serve as a means of partially relaxing the relative head motion hysteresis. The preload oscillation during the seek and settle phases can be at different amplitudes and in the general case may have different frequencies. In one example of this scheme, the relative hysteresis response in this case is reduced from 3.1 nm in the no-preload-modulation case to 2.5 nm.

In another aspect, the preload can be released completely or substantially reduced during the seek phase, and then restored just before transitioning into the settle phase. Then during the settle phase a low-amplitude preload oscillation can be applied. This scheme would, in general, be effective in mitigating head motion hysteresis during long seeks. In one example of this scheme, the RMS value of the relative hysteresis response is reduced to about 1.05 nm in this case.

Figure 24:
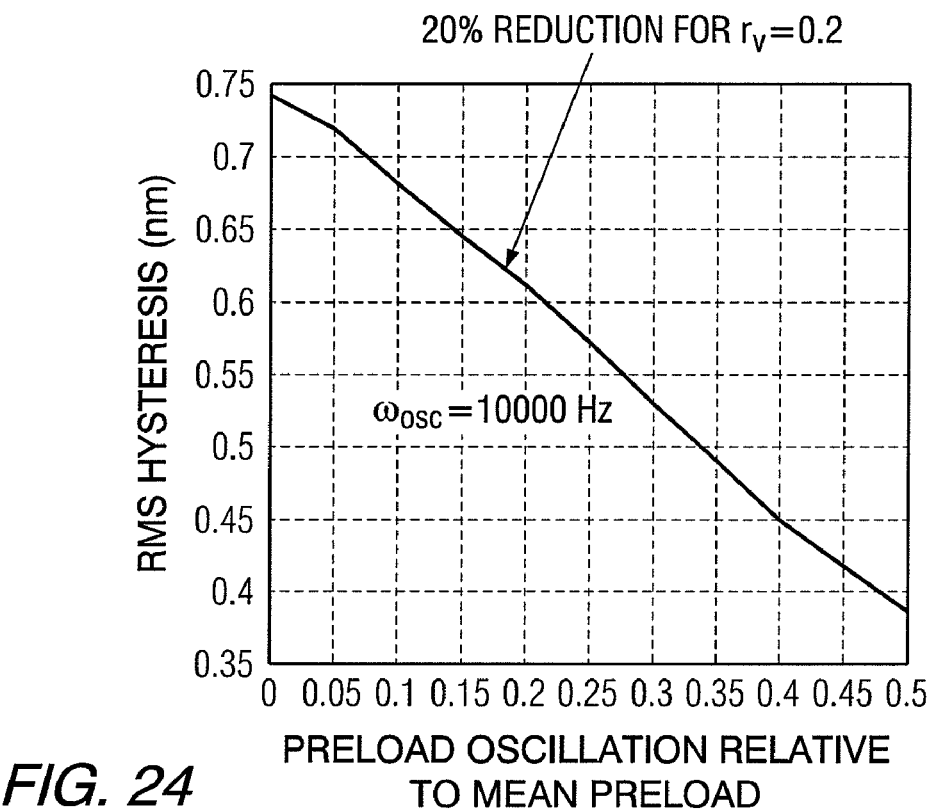
FIG. 24 is a hysteresis during a settle phase.

FIG. 24 shows the variation with relative preload oscillation amplitude, of the RMS amplitude of relative head motion hysteresis during the last 20% of the settle phase. Head preload force is completely released during the seek phase. As expected, the head motion hysteresis is reduced to a larger extent with increasing relative amplitude of preload oscillation. For a preload oscillation amplitude of 20% of mean preload, the reduction in RMS value of relative hysteresis during the final 20% of settle is about 20% with respect to the case with zero preload during the seek phase, but with no preload modulation during settle. Combined with the reduction obtained with preload modulation during the seek phase, the total reduction in relative hysteresis would be about 26%.

Periodic variation of the head preload force can be achieved by periodically oscillating the position of the media substrate in a direction normal to the contact interface, or periodically oscillating the position of the head substrate in a direction normal to the contact interface, or periodically oscillating the active row of heads normal to the contact interface, or periodically oscillating the active heads individually normal to the contact interface. This is referred to as preload oscillation.

Figure 25:
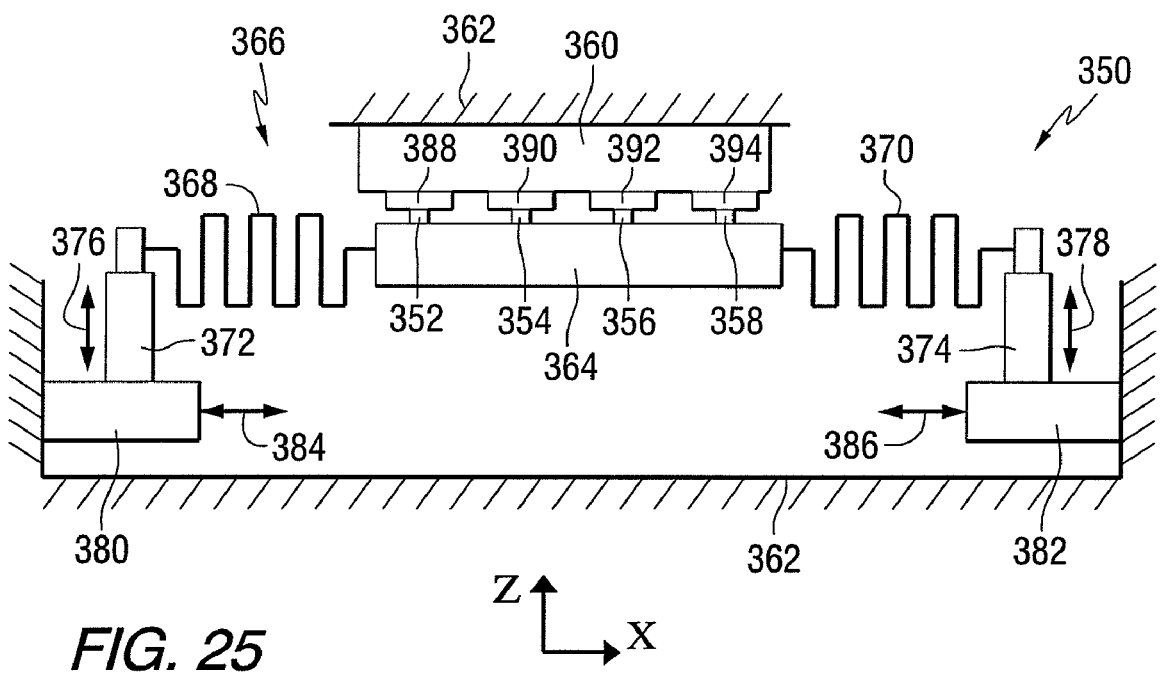
FIG. 25 is a schematic representation of another storage device.

FIG. 25 shows data storage device 350 including a plurality of heads 352, 354, 356 and 358 mounted on a head substrate 360. The head substrate is fixed to a frame 362. A storage media 364 is coupled to the frame by a suspension assembly 366 including springs 368 and 370. First and second actuators 372 and 374 move the suspension assembly and the storage media in the directions indicated by arrows 376 and 378. Third and fourth actuators 380 and 382 move the suspension assembly, the storage media, and the first and second actuators, in the directions indicated by arrows 384 and 386. The heads may also be moved individually using actuators 388, 390, 392 and 394. In the device of FIG. 25, the position of the media substrate can be oscillated in a direction normal to the contact interface. If the suspension were coupled to the head substrate, the position of the head substrate could be periodically oscillated in a direction normal to the contact interface.

The implementations described above and other implementations are within the scope of the following claims.

What is claimed is:

1. An apparatus comprising:
   a data storage media;
   a plurality of heads;
   the data storage media and heads being structured and arranged for relative movement between the heads and storage media causing the heads to move along a scan path; and
   an actuator for changing a magnitude of head to media contact force as the heads move along the scan path, wherein the scan path includes seek portions and settle portions, and the amplitude and frequency of the head to media force is different during the seek portions and the settle portions.

2. The apparatus of claim 1, wherein the amplitude of the head to media force oscillates during the seek portions or the settle portions, or both.

3. The apparatus of claim 1, wherein the actuator comprises:
   first and second electrodes separated by a gap.

4. The apparatus of claim 3, wherein at least one of the first and second electrodes includes an opening.

5. The apparatus of claim 3, wherein the actuator provides relative movement between the storage media and the heads in a direction normal to a plane of the storage media.

6. The apparatus of claim 1, wherein the scan path includes data scan portions and dead zones.

7. The apparatus of claim 6, wherein the actuator applies a first head to media contact force in the data scan portions and a second head to media contact force in the dead zones.

8. The apparatus of claim 7, wherein the second head to media contact force is less than the first head to media contact force.

9. The apparatus of claim 6, wherein the actuator applies continuous oscillation of the head to media contact force.

10. A method comprising:
providing relative movement between a plurality of heads and a storage media, causing the heads to move along a scan path; and
changing a magnitude of head to media contact force as the heads move along the scan path, wherein the scan path includes seek portions and settle portions and the amplitude and frequency of the head to media contact force is different during the seek portions and the settle portions.

11. The method of claim 10, wherein the scan path includes data scan portions and dead zones.

12. The method of claim 11, wherein a first head to media contact force is applied in the data scan portions and a second head to media contact force is applied in the dead zones.

13. The method of claim 12, wherein the second head to media contact force is less than the first head to media contact force.

14. The method of claim 11, wherein the head to media contact force oscillates continually in the data scan portions.

15. The method of claim 10, wherein the head to media contact force is applied continuously or in a plurality of discrete steps.

16. The method of claim 10, wherein the head to media contact force is reduced or released during the seek portions and applied during the settle portions.

17. The method of claim 16, wherein the amplitude of the head to media contact force oscillates during the seek portions or the settle portions, or both.

* * * * *